United States Patent
Neumann et al.

(10) Patent No.: US 9,638,471 B2
(45) Date of Patent: May 2, 2017

(54) BALANCED HEAT EXCHANGER SYSTEMS AND METHODS

(71) Applicant: Hamilton Sundstrand Corporation, Charlotte, NC (US)

(72) Inventors: Mark C. Neumann, Granby, CT (US); Leo J. Veilleux, Jr., Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 326 days.

(21) Appl. No.: 14/537,311

(22) Filed: Nov. 10, 2014

(65) Prior Publication Data
US 2016/0131432 A1    May 12, 2016

(51) Int. Cl.
*F28F 3/00* (2006.01)
*F28D 9/00* (2006.01)
*B23P 15/26* (2006.01)

(52) U.S. Cl.
CPC ............ *F28D 9/0093* (2013.01); *B23P 15/26* (2013.01)

(58) Field of Classification Search
CPC ........ F28D 9/0093; F28D 9/00; F28D 1/0308; F28D 9/0006; F28D 9/0025; F28D 9/0037; F28D 9/0062; F28D 9/0081; B23P 15/26; F28F 3/005; F28F 3/08; F28F 3/02; F28F 3/083
(Continued)

(56) References Cited

U.S. PATENT DOCUMENTS 3,943,994 A * 3/1976 Cleveland ................ B01J 35/04
                                                         165/10
4,327,802 A * 5/1982 Beldam ................. F28D 1/0333
                                                         165/153
(Continued)

FOREIGN PATENT DOCUMENTS

CN       204141799       2/2015
EP        0040303       11/1981
(Continued)

OTHER PUBLICATIONS

International Search Report, International Application No. GB1519833.6, Date of Mailing Mar. 10, 2016, United Kingdom Intellectual Property Office; International Search Report 4 pages.

*Primary Examiner* — Justin Jonaitis
(74) *Attorney, Agent, or Firm* — Cantor Colburn LLP

(57) ABSTRACT

A heat exchanger is provided having a first fluid circuit defining a first volume and configured to permit a first fluid to flow therethrough with a first fluid supply. The heat exchanger includes a second fluid circuit defining a second volume separate from the first volume and sharing at least one common wall with the first enclosed volume, and configured to permit a second fluid to flow therethrough from a second fluid supply. One or more thermal transfer sheets having one or more channels therein are configured in structural and thermal contact with both the first and second fluid circuits, the channels having a thermodynamic fluid disposed therein and configured to transfer heat between the first fluid circuit and the second fluid circuit. A thermal transfer rate through the at least one common wall is less than a thermal transfer rate of the one or more thermal transfer sheets.

10 Claims, 4 Drawing Sheets

(58) Field of Classification Search
USPC .......................................... 165/166, 164, 165
See application file for complete search history.

(56) References Cited

U.S. PATENT DOCUMENTS

| 5,462,113 | A | * | 10/1995 | Wand | .................... | F28D 9/0093 |
| | | | | | | 165/140 |
| 7,753,105 | B2 | * | 7/2010 | Acre | .................... | B60H 1/3227 |
| | | | | | | 165/140 |

FOREIGN PATENT DOCUMENTS

| GB | 2490704 | 11/2012 |
| JP | S5855686 A | 4/1983 |

\* cited by examiner

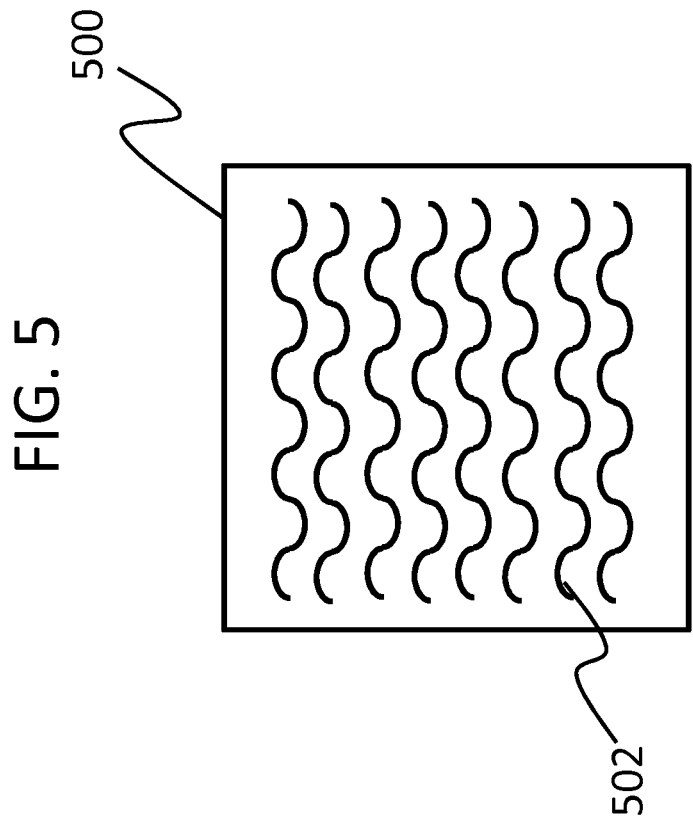
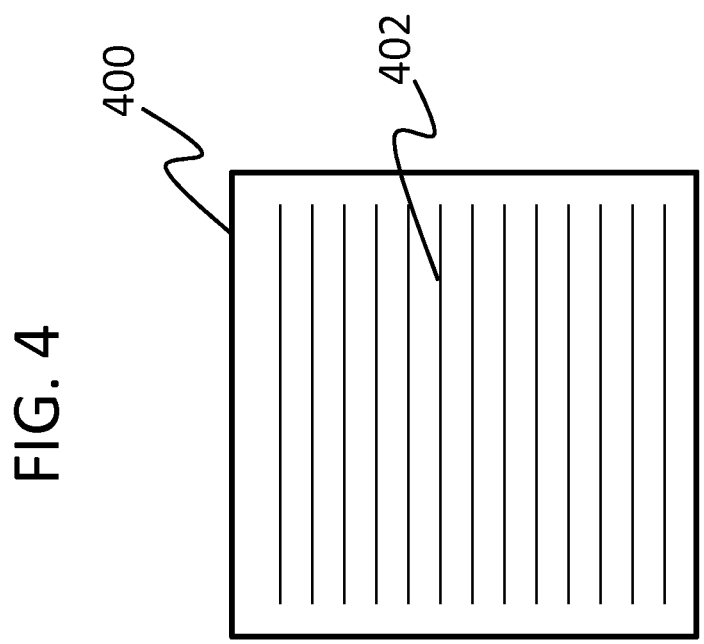

BALANCED HEAT EXCHANGER SYSTEMS AND METHODS

BACKGROUND OF THE INVENTION

This invention relates generally to heat exchangers, and more specifically to aircraft heat exchangers.

In aircraft engine oil cooling systems, oil is commonly pumped through an air-oil heat exchanger to remove excess heat and cool the engine oil. Engine fan air is utilized and provided as a cooling medium that flows into and through the heat exchanger to absorb and remove heat from the oil. The size of the heat exchanger is typically influenced by, for example, (i) the temperature of the cooling air, (ii) the temperature of the oil when it enters the heat exchanger, and (iii) the desired temperature of the oil when it exits the heat exchanger. With size constraints based on the temperatures of the system and fluids, the effectiveness or efficiency of the heat exchanger is also impacted by, for example, (i) the convection and thermal transfer of heat from the oil to heat exchanger surfaces, (ii) the conduction and thermal transfer of the heat through the material of the heat exchanger surfaces, and (iii) the conduction and thermal transfer of heat into the air of the heat exchanger. In sum, the convection of thermal energy to the air side of the heat exchanger is typically most limited and hence establishes the thermal energy transfer from the oil to air, thus cooling the oil.

To achieve thermal transfer between a hot fluid, such as oil, and a cold fluid, such as air, layers of the two fluids are stacked within a heat exchanger. The two fluids are kept fluidly isolated, but maintain thermal communication to transfer heat between the two fluids. Accordingly, to maximize thermal transfer, the greatest surface area of contact is desired, and thus the layering of hot and cold fluids is alternated in the stack of layers.

BRIEF DESCRIPTION OF THE INVENTION

According to one embodiment a heat exchanger is provided. The heat exchanger includes a first fluid circuit defining a first volume and configured to permit a first fluid to flow therethrough with a first fluid supply connected to the first fluid circuit and configured to supply a first fluid to the first fluid circuit. A second fluid circuit defining a second volume is provided separate from the first volume and sharing at least one common wall with the first enclosed volume, and configured to permit a second fluid to flow therethrough with a second fluid supply connected to the second fluid circuit and configured to supply a second fluid to the second fluid circuit. One or more thermal transfer sheets defining one or more channels therein, the one or more thermal transfer sheets configured in structural and thermal contact with both the first fluid circuit and the second fluid circuit, the one or more channels having a thermodynamic fluid disposed therein and configured to transfer heat between the first fluid circuit and the second fluid circuit. Further, a thermal transfer rate through the at least one common wall is less than a thermal transfer rate of the one or more thermal transfer sheets.

According to another embodiment, a method of manufacturing a heat exchanger is provided. The method includes forming a first portion of a heat exchanger configured to have a first fluid pass therethrough, forming a second portion of a heat exchanger configured to have a second fluid pass therethrough, the second portion sharing at least one common wall with the first portion, and thermally connecting the first portion and the second portion with one or more thermal transfer sheets configured to transfer thermal energy from the first portion to the second portion. In the configuration, a thermal transfer rate through the at least one common wall is less than a thermal transfer rate of the one or more thermal transfer sheets.

Technical effects of embodiments of the invention include a heat exchanger that is configured with multiple air layers. Between the air layers are located thermal transfer sheets. The thermal transfer sheets are sheets having channels therein that are filled with a thermodynamic fluid. There are no alternating layers of oil located between the air layers or the thermal transfer sheets. Rather, an oil chamber, or layers of oil in an enclosed space, is configured to the side and adjacent to the air layers, with the thermal transfer sheets thermally connecting the air layers with the oil layers. This results in an increased quantity or volume of air channels that can be installed or housed within the heat exchanger air flow region as compared to a traditional heat exchanger of the same size. Further, this allows for smaller heat exchangers that provide the same cooling effectiveness.

Additional and/or alternative technical effects of embodiments of the invention include the ability to optimize the thermal transfer efficiency, while reducing the weight and volume of the entire heat exchanger. Further, embodiments of the invention provide thermally balanced and/or optimized heat exchangers that may have structurally or physically unbalanced proportions, enabling a more optimized configuration over the uniform traditional heat exchangers.

Further technical effects of embodiments of the invention include physically separating the two fluid circuits of the heat exchanger while maintaining a high thermal transfer efficiency therebetween.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 4 is a top plan view of a first exemplary embodiment of a thermal transfer sheet in accordance with the invention;

FIG. 5 is a top plan view of a second exemplary embodiment of a thermal transfer sheet in accordance with the invention; and

DETAILED DESCRIPTION OF THE INVENTION

Figure 1:
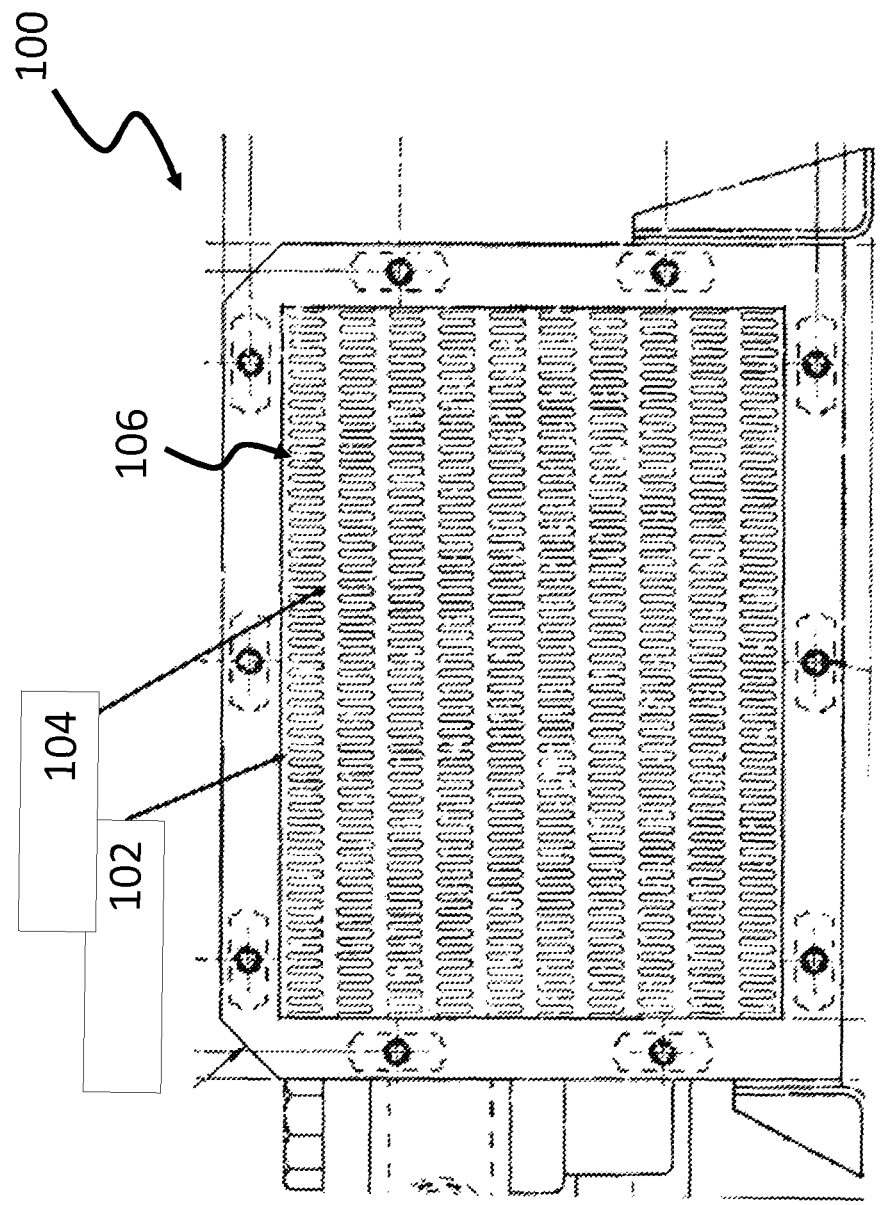
FIG. 1 is a schematic diagram of an aircraft air-oil heat exchanger.

A typical heat exchanger 100 is shown in FIG. 1. As shown, the construction utilizes alternating layers of air 102 and oil 104 to allow heat transfer from the oil to the air, with fluid isolating and thermal transfer separators 106 forming fins located therebetween. With alternating layers of air 102 and oil 104, the thermal transfer efficiency may not be optimized. This is because oil convection is greater than air convection, and thus, this may result in an inefficient thermal energy transfer between the fluids. Accordingly, the number of oil layers may be reduced and the number of air layers may be increased as compared to a system with an equal number of each layer. However, even with a disparity of numbers of the oil and air layers, alternating layers are still required to enable transfer of the thermal energy efficiently between the two fluids. Thus, alternating layers of air 102 and oil 104, although required for heat transfer, creates a large heat exchanger that may not be optimal for aircraft applications.

Specifically, because of the large volume required for the alternating layers of air 102 and oil 104, the frontal area/volume of the heat exchanger causes excess weight and, potentially, aerodynamic drag when applied to aircraft applications. For example, when such traditional heat exchangers are employed on gas turbine engines, the result may be a loss in overall engine efficiency. This may result from the oil layers blocking a flow of air into the heat exchangers. This reduces the air flow, and thus reduces the system efficiency.

According to the techniques and heat exchangers of this disclosure, a heat exchanger for cooling a first fluid with a second fluid is provided. For example, the first fluid may be hot oil and the second fluid may be cool air in an aircraft engine. When employed with a turbine engine, for example, the cool air is supplied from the engine fan air stream to cool the engine oil that flows through the heat exchanger.

Figure 2:
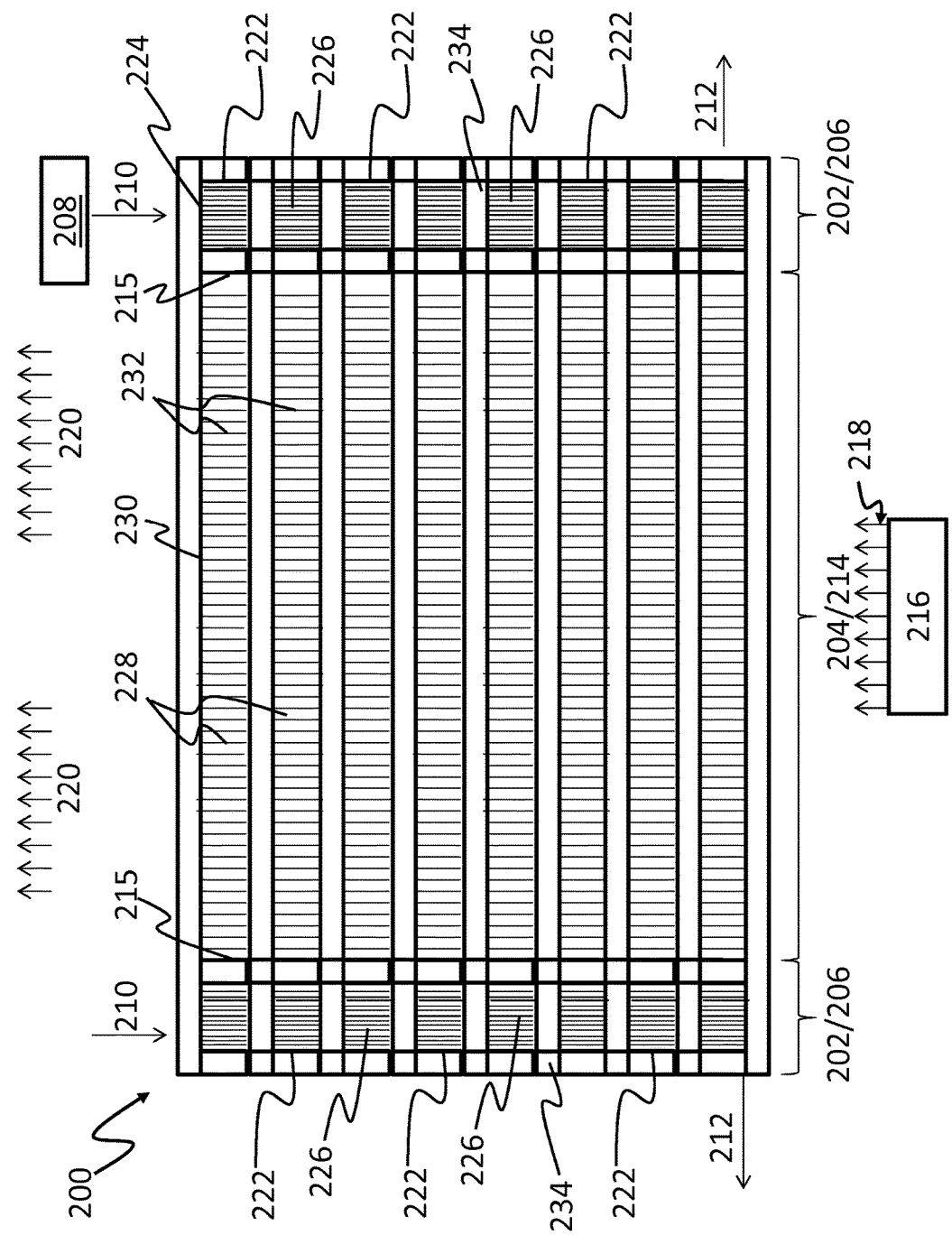
FIG. 2 is a front view schematic diagram of a heat exchanger in accordance with an exemplary embodiment of the invention.

Referring now to FIG. 2, a block diagram of a heat exchanger 200 in accordance with an exemplary embodiment of the invention is shown. The heat exchanger 200 includes a first portion or side 202 and a second portion or side 204, wherein a fluid in the first portion 202 is provided to have heat removed therefrom, and a fluid in the second portion 204 is a cooling fluid configured to absorb and remove heat from the fluid in the first portion 202.

The first portion 202 of the heat exchanger 200 defines a first circuit 206 for a first fluid, such as hot oil. The first circuit 206 is supplied with the first fluid by a first fluid supply 208. The first fluid supply 208 provides hot first fluid at an inlet 210 to the first circuit 206 and cooled first fluid edits the first circuit 206 at outlet 212. The first circuit 206 forms a first enclosed volume that is fluidly separate from the second portion 204. Further, in some embodiments, the first circuit 206 may be physically separate from the second portion 204 in addition to be fluidly separate therefrom. In some embodiments, the first circuit 206 includes channels or layers through which the first fluid may flow, and the interior and/or exterior surfaces of the channels or layers may include fins configured to improve thermal energy transfer from the first fluid into the materials that make up the channels or layers of the first circuit 206.

The second portion 204 of the heat exchanger 200 defines a second circuit 214 for a second fluid, such as cool air. The second circuit 214 is supplied with the second fluid by a second fluid supply 216. The second fluid supply 216 provides cool or cold second fluid at an inlet 218 to the second circuit 214. Although inlet 218 appears to be moving vertically on the page of FIG. 2, those of skill in the art will appreciate that the inlet may be configured to be into the page, and the arrows are merely provided for demonstrative purposes. The second fluid flows through the second circuit 214 and exits the second circuit 214 at outlet 220. Similar to the inlet 218, the outlet 220 may actually be out of the page of FIG. 2, rather than upward on the drawing. The second circuit 214 forms a second enclosed volume that is fluidly separate from the first portion 202, wherein the first and second enclosed volumes share a structural element, such as a common wall 215, but may not share a thermally conductive element. In some embodiments, the second circuit 214 may be physically separate from the first portion 202 in addition to be fluidly separate therefrom.

In some embodiments, the second circuit 214 includes channels or layers through which the second fluid may flow, and the interior and/or exterior surfaces of the channels or layers may include fins configured to improve thermal energy transfer from the materials that make up the channels or layers of the second circuit 214 and the second fluid.

As shown in FIG. 2, the heat exchanger 200 includes a number of first fluid layers 222 within an enclosure 224, on the first portion 202. The first fluid layers 222, as shown, include fins 226 that provide extended and increased surface area for thermal energy transfer as the first fluid flows through the first fluid layers 222. Similarly, on the second portion 204, a number of second fluid layers 228 within an enclosure 230 are provided. The second fluid layers 228, as shown, include fins 232 that provide extended and increased surface area for thermal energy transfer as the second fluid flows through the second fluid layers 228.

As shown in FIG. 2, the various layers 222 and 228 are stacked vertically. Each layer 222 and 228 is separated by a thermal transfer sheet 234 disposed between adjacent layers. The thermal transfer sheet 234 is configured as a sheet filled with a thermodynamic fluid to provide thermal communication between the adjacent layers 222 and 228. Thus, thermal transfer sheets 234 provide the thermal connection between the first portion 202 and the second portion 204, and allows for the two portions to be constructed for optimization of the particular fluids contained therein.

The fluid within the thermal transfer sheets 234 may be selected to provide a thermodynamic evaporating and condensing cycle. The condensing occurs on the second portion 204 and the evaporating occurs on the first portion 202. In some embodiments, a surface roughening or wicking treatment can be applied to the interior surfaces of the thermal transfer sheet 234 to promote evaporation, condensation, and/or the transport process of the fluid within the thermal transfer sheets 234 from the first portion 202 to the second portion 204. The surface roughness can be created with grit blasting processes or other known means and methods. Further, the wicking material can be added using sintered porous materials such as a cuprous oxide to create a porous wick structure. The thermal transfer sheets 234 extend from within the second portion 204 second fluid layers 228 and contact the second fluid that passes through the second portion 204. The thermal transfer sheets then extend from the second portion 204 and protrude into the adjacent first fluid layers 222 of first portion 202, thus providing thermal communication between the first portion 202 and the second portion 204.

The common wall 215 may be configured or formed of a material that has a lower thermal transfer rate than the thermal transfer sheets 234. Thus, the first portion 202 and the second portion 204 may be physically connected by the common wall 215, but substantially primarily thermally connected by the thermal transfer sheets 234. Moreover, in some embodiments, the common wall 215 may be formed of a thermally isolating material, wherein the only thermal contact between the first portion 202 and the second portion 204 may be by the thermal transfer sheets 234.

Further, as shown in FIG. 2, fins 226 and 232 are configured to extend from the surface of the thermal transfer sheets 234 into the layers 222 and 228 of the first and second fluids, thereby increasing the thermal energy transfer surface area. The fins 226 and 232 thus increase the efficiency and effectiveness of the thermal transfer from the first portion 202 to the second portion 204 by means of the thermal transfer sheets 234.

As noted, the thermal transfer sheets 234 are filled with a thermodynamic fluid. The interiors of the thermal transfer sheets 234 can include micro-channels filled with the thermodynamic fluid. The channels are configured to enable fluid flow of the thermodynamic fluid within the channels during the evaporation-condensation cycle and thus carry heat from the first portion 202 to the second portion 204.

Figure 3:
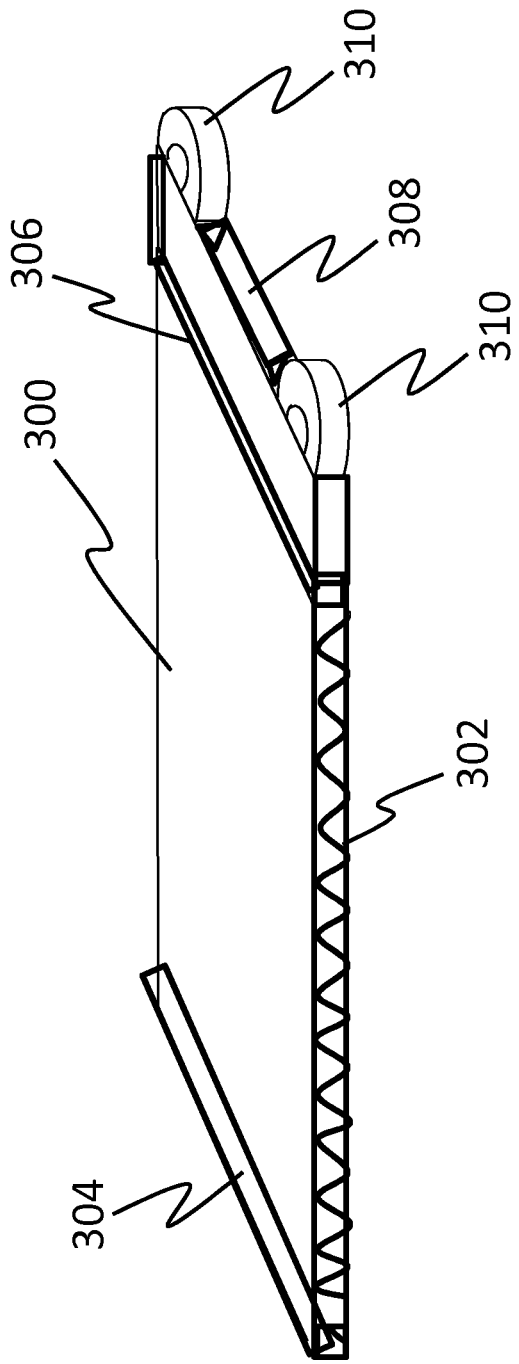
FIG. 3 is an isometric view of an exemplary structural layer of a heat exchanger in accordance with an exemplary embodiment of the invention.

Basic construction of the heat exchanger in accordance with embodiments of the invention involves providing a top layer or closure that is configured to form the top structure of the heat exchanger. For example, with reference to FIG. 3, an exemplary structural layer 300 of a heat exchanger in accordance with embodiments of the invention is shown. The layer 300 of FIG. 3 may be an exemplary structure of a top layer (or any other layer) of the heat exchanger. For example, layer 300 may represent a top most layer of the heat exchanger. The layer 300, when thus configured, provides a closure to both the first portion and the second at the top, i.e., closes in the fluids of the two portions.

Below the top layer 300 are corrugated fins 302. The corrugated fins 302 may be approximately 0.003-0.006 inches in thickness. The fins 302 may be manufactured out of aluminum sheet stock or other heat transfer materials capable of being brazed. A solid closure bar 304 provides closure of the second portion (e.g., air side) to the exterior of the heat exchanger on one side. On the other side, the side adjacent to the first portion, an additional separation bar 306 separates the fluids in this layer 300. The separating bar 306 runs the complete length of the heat exchanger. In addition closure bars 308 are provided on the periphery of the first portion layer, thus providing closure of the first portion. Interruptions in the closure bars 308 can be provided at the location of the inlet and outlet plenums for the first fluid. All closure bar (304, 306, 308) widths are typically in the range of about 0.080 inches to about 0.160 inches. The closure bar (304, 306, 308) height is typically equal or slightly lower than the height of the fins 302 by up to approximately 0.002 inches to assure good braze contact with the fins 302.

Below the layer 300 would be located a thermal transfer sheet, as discussed above with respect to FIG. 2, filled with thermodynamic fluid for heat transfer between the first and second portions. The thermal transfer sheet has top and bottom walls approximately 0.006 inches to 0.014 inches thick. Depending on the temperature operation, the optimal pressure of the filled thermal transfer sheet can be set and sealed. This pressure can range from a vacuum to a positive pressure. The filling occurs after the full assembly and braze process. One filling location on a thermal transfer sheet allows for the filling charge or fill all the channels with the thermodynamic fluid (as shown in FIGS. 4, 5, 6). Further, in some embodiments, an optional vent location can be utilized to facilitate the filling process to assure the correct fluid content.

Referring again to FIGS. 2 and 3 and the construction of the heat exchanger, below the first thermal transfer sheet, the next layer of the second portion and the first portion fins are placed in a similar manner as described above. This is continued in process of providing a layer that encloses part of the first and second portions followed by a thermal transfer sheet. At the bottom of the heat exchanger a final bottom plate provides closure to the heat exchanger stack similar to the top plate (similar to sheet 300 of FIG. 3).

When employed for aircraft engine oil, oil supply and return header tanks 310 can be welded to the locations for filling and returning the oil. In some embodiments, a frame can be welded to the second fluid inlet and outlet if supply and exit ducting surfaces are required.

Turning now to FIGS. 4 and 5, exemplary embodiments of the thermal transfer sheets 234 of FIG. 2 are shown. Although two exemplary configurations are discussed herein, those of skill in the art will appreciate that various other configurations, geometries, structures etc. of the thermal transfer sheets and channels thereof may be used without departing from the scope of the invention.

FIG. 4 is a top plan view schematic of a heat exchanger thermal transfer sheet 400 in accordance with a first exemplary embodiment. In this embodiment, the thermal transfer sheet 300 includes linear, parallel channels 402. The channels 402 can be in the range of approximately 0.020-0.050 inches wide and tall, but this merely for exemplary purposes and those skilled in the art will appreciate that other size channels may be employed without departing from the scope of the invention. In this example, the thermal transfer sheet 400 may be formed from two sheets of thermally conductive material sandwiched together with the channels fabricated between or as part of the two sheets. Each channel 402 located between the two sheets is fluidly isolated from the other channels 402 of the thermal transfer sheet 400. The channels 402 are filled with thermodynamic fluid. The channels 402 are configured to align transverse to the flow direction through the first and second portions. For example, the fluid and thermal transfer within the channels 402 flow in a direction perpendicular or transverse to the hot and cold flow to which energy is exchanged. Those skilled in the art will appreciate that the flow directions may be different than transverse without departing from the scope of the invention. Further, the thermal transfer sheet 400 can include fins brazed to an exterior surface thereof (See FIG. 2).

FIG. 5 is a top plan view schematic of heat exchanger thermal transfer sheet 500 in accordance with a second exemplary embodiment. In this embodiment, the thermal transfer sheet 500 is substantially similar to the thermal transfer sheet 400 of FIG. 4, but the configuration of the channels is different. Thermal transfer sheet 500 includes wavy channels 502, rather than straight and parallel channels 402 of FIG. 4. The wavy or curved channels 502 may provide stiffness to the thermal transfer sheet 500.

The channels are filled with a thermodynamic fluid that is configured to enable the evaporating and condensing cycle within the thermal transfer sheet, when exposed to the heat of the first portion and the cool of the second portion, respectively. Examples of the thermodynamic fluid that may be used within the thermal transfer sheets include water, alcohol, glycol, naphtha, and other known or to be known thermodynamic fluids, such that a thin liquid-vapor heat spreader is created by the thermal transfer sheet.

In accordance with some embodiments, the channels within each thermal transfer sheet, regardless of the channel configuration, size, geometry, and/or orientation within the sheet, may be formed of embedded micro channels. The micro channels that are embedded within the sheets may be formed by etching, milling, chemical etching, electrical discharge machining, machining, additive manufacturing, casting, or by other methods known in the art. Advantageously, the channels may be relatively small compared to the prior art configuration of oil channels in the heat exchanger, thus reducing the volume and weight of the heat exchangers constructed according to the invention. For example, the prior channels that carried the oil through the air portions of the heat exchanger may be on the order of about 0.1 inches, whereas the thermal transfer sheets of the invention may be on the order of about 0.025 inches thick. Thus, the required mass and volume of the material that is located within the cold section (air section) is significantly reduced, thus eliminating a portion of the blockage that was previously present in heat exchangers.

An example of a thermal transfer sheet in accordance with the invention is a sheet formed of an aluminum material and etching is performed into the surface to form the plurality of channels, in a preconfigured geometry, such as parallel lines, wavy lines, etc. When a second sheet is similarly formed, each of the channels will line up with the channels of the other sheet, and form a fluid flow channel that enables the condensation and evaporation of the invention described herein. In some embodiments, one of the sheets may not be etched, and the other sheet may be etched or manufactured or formed with the channels.

Advantageously, the thermal transfer sheets of the invention extend between two fluids to provide a highly efficient transport of thermal energy from one fluid to another. For example, the thermal transfer sheets disclosed and employed as discussed herein can reduce heat transport resistance over traditional aluminum conduction by about 10 to about 1000 times.

In addition, advantageously, the hot fluid circuit and the cold fluid circuit can be physically separated from each other. Moving the hot circuit to the side or away from and adjacent to the cold circuit enables reduction, for example, in the total frontal area in an engine airstream, which thereby may improve efficiency of the heat exchanger and of the engine itself. In addition, when applied to engine oil cooling on an aircraft, the oil chamber (first portion) physical volume and size is significantly reduced as the size is optimized for the highly efficient oil convection. Furthermore, the hot oil portion no longer need be placed inefficiently between air portion layers. This enables a smaller oil reservoir or circuit, which reduces the overall weight of the heat exchanger. Moreover, because the oil circuit does not need to directly contact the air, the overall structural integrity of the heat exchanger in the air portion can be optimized, thus reducing the weight further.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, although described herein using the application of air and oil as the fluids, with the oil being the hot fluid and the air being the cooling fluid, these examples are provided for explanatory purposes and are not limiting. For example, different fluids, including liquids and gases may be used in heat exchangers in accordance with embodiments of the invention. Further, although described herein as an aircraft engine oil heat exchanger, those skilled in the art will appreciate that this is merely presented for explanatory purposes and heat exchangers in accordance with embodiments of the invention may be employed in any applications in which heat exchangers are used, and particularly where it is desired to increase the efficiency and/or effectiveness of the heat exchanger and/or where it is desired to reduce the size and/or weight of the heat exchanger.

Furthermore, for example, those of skill in the art will appreciate that in the heat exchangers disclosed herein, and variations thereof, the fluid flows may have flow directions that can be parallel-flow, cross-flow, or counter-flow and also may be different on the first portion and the second portion of the heat exchanger. Moreover, the fins and thermal transfer surfaces and mechanisms described herein may be configured in different orientations and/or have different geometries. For example, the fins that extend into the first fluid and the second fluid may be perpendicular, angled, etc. with respect to a surface to which they are attached, such as to the thermal sheets.

Furthermore, those of skill in the art will appreciate that although the heat exchangers described and shown herein include fluid circuits for the fluid flow, this is merely provided for exemplary purposes. As used herein, a fluid circuit may include fluid pipes, fluid chambers, fluid reservoirs, or other similar configurations known in the art and/or combinations thereof.

Furthermore, although the thermal transfer sheets of the above disclosure have been described with respect to two exemplary embodiments, those of skill in the art will appreciate that additional channel configurations within the thermal transfer sheets can be used to provide the heat transfer evaporating and condensing cycle of the heat exchanger without departing from the scope of the invention.

Additionally, in accordance with embodiments herein, the materials that are used to form the various components may be selected for optimized operation, including considerations of high thermal transfer, low weight, and appropriate structural integrity. For example, in some embodiments, aluminum or other high heat transfer materials may be used for various parts of the heat exchangers disclosed herein. Moreover, the shapes of the various components of the heat exchangers disclosed herein can be rectangular, circular, annular, or have other geometries without departing from the scope of the invention.

Moreover, in some embodiments, the thermodynamic fluid can be installed and filled into the thermal transfer sheets after a braze assembly process. The thermodynamic fluid in the thermal transfer sheets can then be sealed with epoxy, seals, crimping, brazing, welding, soldering, and/or other sealing devices, mechanisms, and/or processes.

Moreover, various methods of manufacture may be used without departing from the scope of the invention. For example, the thermal transfer sheets can be formed by fusion bonding, diffusion bonding, epoxy, use of additive manufacturing, welding, soldering, crimping or other means and mechanisms or combinations thereof.

Accordingly, the invention is not to be seen as limited by the foregoing description, but is only limited by the scope of the appended claims.

What is claimed is:

1. A heat exchanger comprising:
   a first fluid circuit defining a first volume and configured to permit a first fluid to flow therethrough;
   a first fluid supply connected to the first fluid circuit and configured to supply a first fluid to the first fluid circuit;
   a second fluid circuit defining a second volume separate from the first volume and sharing at least one common wall with the first enclosed volume, and configured to permit a second fluid to flow therethrough;
   a second fluid supply connected to the second fluid circuit and configured to supply a second fluid to the second fluid circuit; and
   two thermal transfer sheets sandwiched together and defining one or more channels are formed therebetween, the thermal transfer sheets configured in structural and thermal contact with both the first fluid circuit and the second fluid circuit, the one or more channels having a thermodynamic fluid disposed therein and configured to transfer heat between the first fluid circuit and the second fluid circuit, wherein a thermal transfer rate through the at least one common wall is less than a thermal transfer rate of the thermal transfer sheets.

2. The heat exchanger of claim 1, wherein the difference in thermal transfer rates between the common wall and the thermal transfer sheets occurs during operation.

3. The heat exchanger of claim 1, wherein the first fluid is a liquid and the second fluid is a gas.

4. The heat exchanger of claim 3, wherein the liquid is oil and the gas is air.

5. The heat exchanger of claim 1, wherein the thermodynamic fluid comprises at least one of water, alcohol, glycol, and naphtha.

6. The heat exchanger of claim 1, wherein the heat exchanger is used on a gas turbine engine.

7. A method of manufacturing a heat exchanger, the method comprising:
forming a first portion of a heat exchanger configured to have a first fluid pass therethrough;
forming a second portion of a heat exchanger configured to have a second fluid pass therethrough, the second portion sharing at least one common wall with the first portion; and
thermally connecting the first portion and the second portion with two thermal transfer sheets sandwiched together and defining one or more channels are formed therebetween and filling the one or more channels with a thermodynamic fluid configured to transfer thermal energy from the first portion to the second portion, wherein a thermal transfer rate through the at least one common wall is less than a thermal transfer rate of the thermal transfer sheets.

8. The method of claim 7, wherein at least one of the first portion, the second portion, and the thermal transfer sheets are formed by additive manufacturing.

9. The method of claim 7, wherein the one or more channels are formed by at least one of additive manufacturing, etching, chemical etching, milling, electrical discharge machining, casting, and machining.

10. The method of claim 7, further comprising configuring the heat exchanger to cool an engine oil of an aircraft.

* * * * *